US006648433B2

United States Patent
Kusic (10) Patent No.: US 6,648,433 B2
(45) Date of Patent: Nov. 18, 2003

(54) SPIRALLING MISSILE—B (76) Inventor: Tom Kusic, GPO Box 932, Melbourne, Vic. 3001 (AU)

( * ) Notice: Subject to any disclaimer, the term of this patent is extended or adjusted under 35 U.S.C. 154(b) by 0 days.

(21) Appl. No.: 10/067,964
(22) Filed: Feb. 8, 2002

(65) Prior Publication Data
US 2002/0109040 A1 Aug. 15, 2002

(30) Foreign Application Priority Data

Feb. 9, 2001 (AU) .............................. PR3035

(51) Int. Cl.[7] .............................................. F42B 10/06
(52) U.S. Cl. ................................................... 344/3.22
(58) Field of Search .............................. 244/3.24, 3.25, 244/3.26, 3.27, 3.28, 3.29, 3.3, 3.23, 3.1, 138 R; 102/388, 386

(56) References Cited

U.S. PATENT DOCUMENTS

| 3,603,533 | A | | 9/1971 | Stripling |
| 4,356,770 | A | * | 11/1982 | Atanasoff et al. ........... 102/384 |
| 4,565,340 | A | | 1/1986 | Bains |
| 4,583,703 | A | * | 4/1986 | Kline ........................ 244/3.24 |
| 4,964,593 | A | | 10/1990 | Kranz |
| 5,048,772 | A | | 9/1991 | Wisshaupt |
| 5,322,243 | A | | 6/1994 | Stoy |
| 5,975,461 | A | | 11/1999 | Ullrich |

FOREIGN PATENT DOCUMENTS

JP          94/6-26799          2/1994

* cited by examiner

Primary Examiner—Peter M. Poon
Assistant Examiner—Z. D. Collins (57) ABSTRACT

A cross-section of a missile 1 with the missile attachment 2. The missile attachment consists of a cylindrical tube 3 which encircles part of the missile 1, and a protruding section 4 with a concave forward facing surface area 5. Shown also is a friction inducing movable component in the form of a lever 11 pivotly attached to the missile by a bracket 12, such that the lever 11 can be pivotly moved an actuating mechanism which is in the form of an electric motor 13 using a rotor arm 14. When the lever is pivoted by the electric motor 13, using the rotor arm 14, a part of the lever is pressed through a hole 15 in the missile 1 so that the part of the lever that is pressed through the hole can reach the cylindrical tube. As the rotor arm 14 presses harder against the lever, the lever is pressed harder against the cylindrical tube. With the friction that occurs between the lever and the cylindrical tube, the rotation of the cylindrical tube relative to the missile can be controlled, so that the spiralling motion of the missile can be controlled. A computer 16 controls the action of the electric motor 13, and a battery 17 provides electrical power for the computer and the electrical motor.

34 Claims, 10 Drawing Sheets

SPIRALLING MISSILE— B

Armies around the world have weapons that are capable of destroying approaching missiles. The current invention provides a missile with a missile attachment which missile attachment is such that it can force the missile to travel in a spiralling motion. By travelling in a spiralling motion the missile would be harder to destroy by counter missile weapons such as radar controlled machine guns.

The missile attachment consists of a tube with a protruding section protruding sideways from the tube. The tube is fitted to the missile such that it encircles part of the missile and such that the tube can rotate continuously around the encircled part of the The protruding section protruding from the tube has a forward facing surface area. The forward facing surface area is shaped so that during forward flight of the missile the impact of air on the forward facing surface area would cause the tube to rotate relative to the part of the missile that is encircled by the tube.

To enhance the spiralling ability of the missile and to provide a means to control the spiralling motion, the missile is fitted with a friction inducing attachment.

The friction inducing attachment is used to create friction between the tube and the missile through a continuous rubbing motion. In one form of invention the friction inducing attachment consists of a moveable component and an actuating mechanism. The moveable component can be pushed towards the tube by the actuating mechanism to create friction between the tube and the moveable component.

The friction is used as a means to restrain the tube from rotating freely but without stopping the tube from rotating around the missile.

In another form of the missile the tube that encircles part of the missile has an internally protruding section against which the moveable component of the friction inducing attachment can be pushed towards to create friction.

In one form of the missile the moveable component is pushed through a hole in the missile so that it can reach the tube to induce friction against the tube.

In one form of the missile the moveable component is in the form of rod that can be pushed towards the tube of the missile attachment.

In another form of the missile the moveable component is a moveable mass of solid matter, with the solid matter being rubber in one form of the invention.

In another form of the missile the moveable component is a lever pivotly mounted in the missile.

In one form of the missile the actuating mechanism that forms part of the friction inducing attachment is a hydraulic pump that can move the moveable component toward the cylindrical tube.

In another form of the missile the actuating mechanism that forms part of the friction inducing attachment is an electric motor that can move the moveable component toward the cylindrical tube.

In another form of the missile the actuating mechanism that forms part of the friction inducing attachment is a spring that can move the moveable component toward the cylindrical tube.

In one form of the missile the tube that forms part of the missile attachment is cylindrical.

In one form of the missile the forward facing surface area of the protruding section is concave.

In another form of the missile the forward facing surface area is slanted forward.

In one form of the missile the forward facing surface area faces a direction, which said direction is a direction of travel that the missile would travel when launched if the missile was not affected by the missile attachment.

In another form of the missile the forward facing surface faces a direction, which said direction has as a component a direction of travel that the missile would travel in when launched if the missile was not affected by the missile attachment.

BRIEF DESCRIPTION OF THE SEVERAL VIEWS OF THE DRAWINGS

Embodiments of the invention will now be described by way of example with reference to the accompanying drawings, of which.

Figure 1:
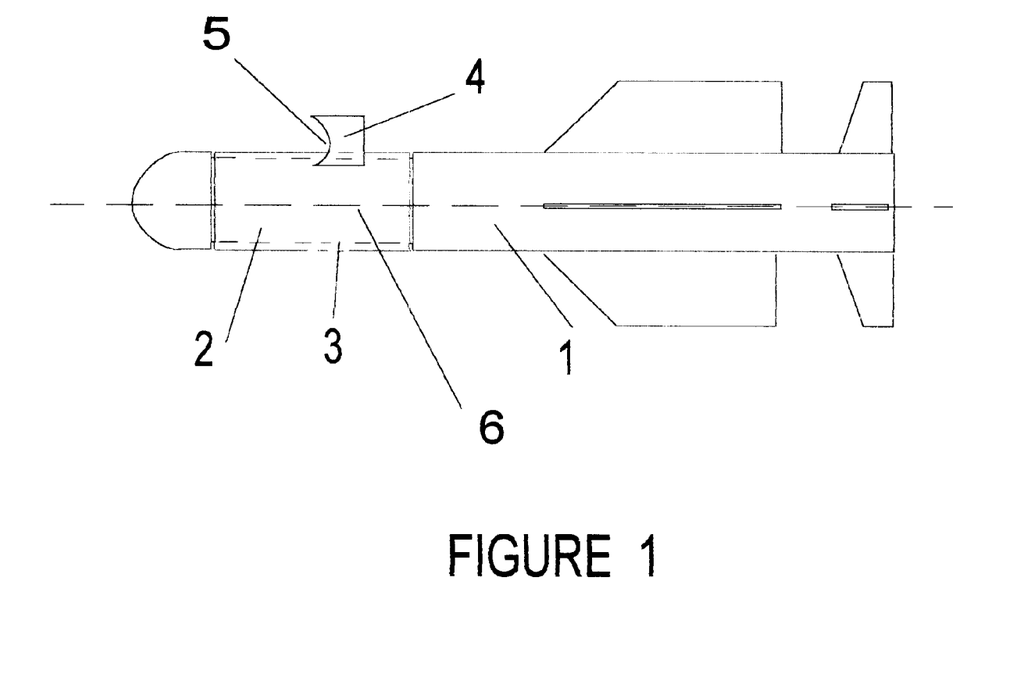
FIG. 1 shows the exterior of a missile with a rotatable tube and a protruding section with a concave forward facing surface area protruding from the rotatable tube.

FIG. 1 shows a side view of one form of a missile 1 with a missile attachment 2 according to this invention. The missile attachment 2 consists of a tube 3 with a protruding section 4. The protruding section 4 has a concave forward facing surface area 5. The tube 3 is in the form of a cylindrical tube and has a longitudinal axis of rotation 6 and is fitted to the missile so that it encircles part of the missile and such that it can rotate continuously relative to the missile 1 during flight of the missile.

Figure 2:
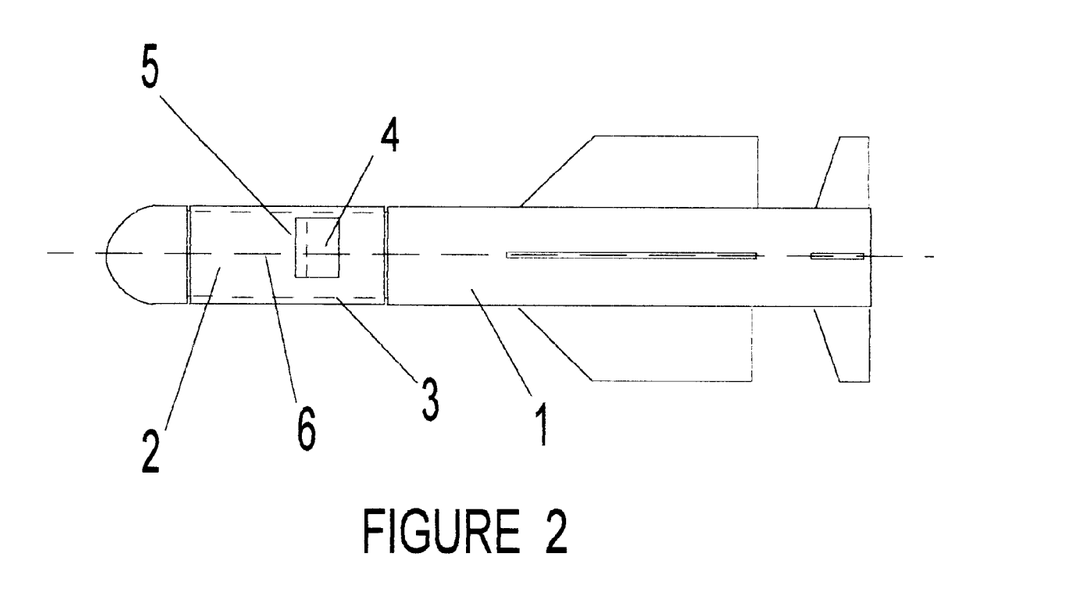
FIG. 2 shows the protruding section of FIG. 1 from a different angle after the rotatable tube been rotated.

FIG. 2 shows the missile 1 of FIG. 1 as viewed from above. The protruding section 4 is shown to be rectangle shaped and is larger on the right side of the longitudinal axis 6 than on the left side of the longitudinal axis. The forward facing surface area 5 is larger on the right side. By being larger on the right side of the longitudinal axis 6, the forward facing surface area 5 would cause the cylindrical tube 3 to rotate relative to the missile during forward flight of the missile. The concave shape of the forward facing surface area 5 would produce a lateral pulling force on the cylindrical tube 3 during forward flight of the missile, thereby dragging the missile 1 sideways. The concave forward facing surface area 5 faces a direction that the missile 1 would travel in when launched if the missile was not affected by the missile attachment 2.

Figure 3:
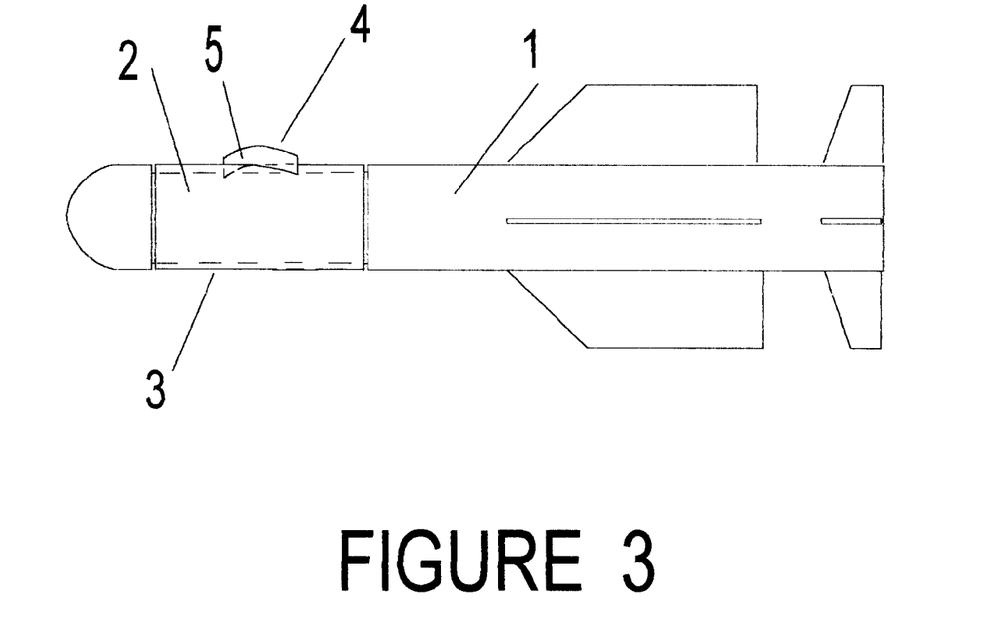
FIG. 3 shows the positioning of a fin on the rotatable tube such that the fin can force the tube to rotate.

FIG. 3 shows missile 1 with a missile attachment 2, the protruding section 4 as a fin protruding from the cylindrical tube 3. The protruding section 4 has a forward forward facing surface area 5 that faces a direction of travel that has as a component the direction of travel that the missile would have when launched if the missile was not affected by the missile attachment.

Figure 4:
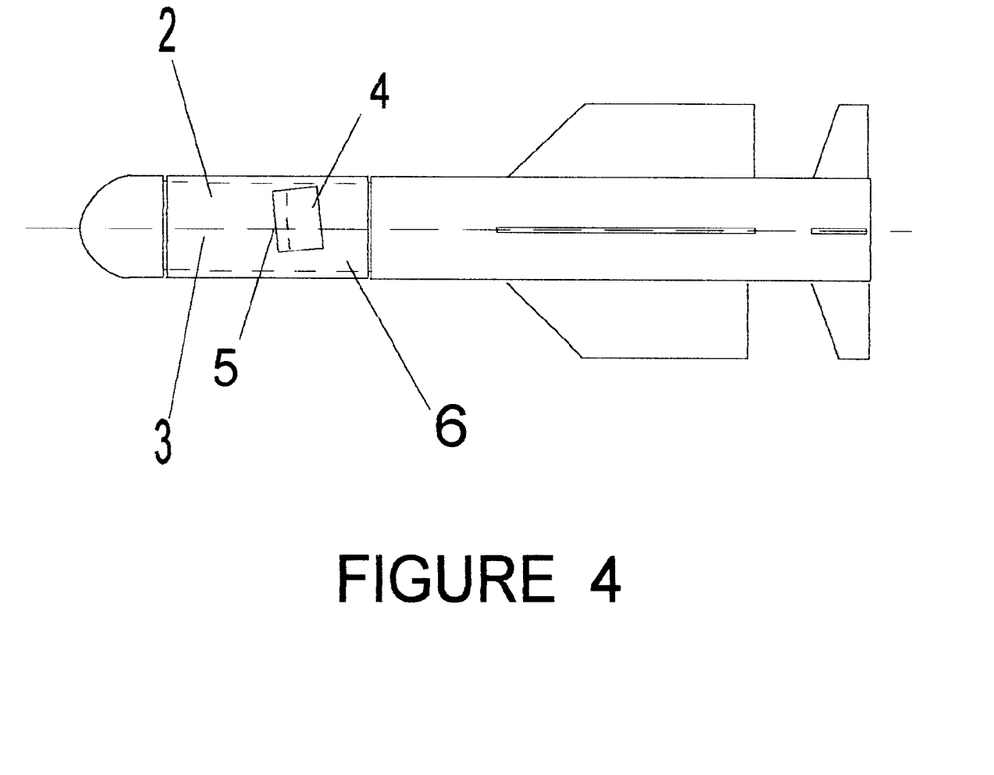
FIG. 4 shows a protruding section similar to that of FIG. 2, which protruding section has been turned relative to the rotatable tube.

FIG. 4 shows the protruding section 4 of FIG. 1 as viewed from above. The protruding section 4 is now shown as being rotated anti-clockwise relative to the longitudinal axis of rotation 6 of the tube 3. By being turned anit-clockwise, the concave forward facing surface area 5 would exert a greater rotational force on the cylindrical tube than when the concave forward facing surface area is not rotated in the manner shown. In FIG. 4 the concave forward facing surface area is facing a direction of travel that has as component a direction of travel that the missile 1 would travel in when launched if the missile was not affected by the the missile attachment 2.

Figure 5:
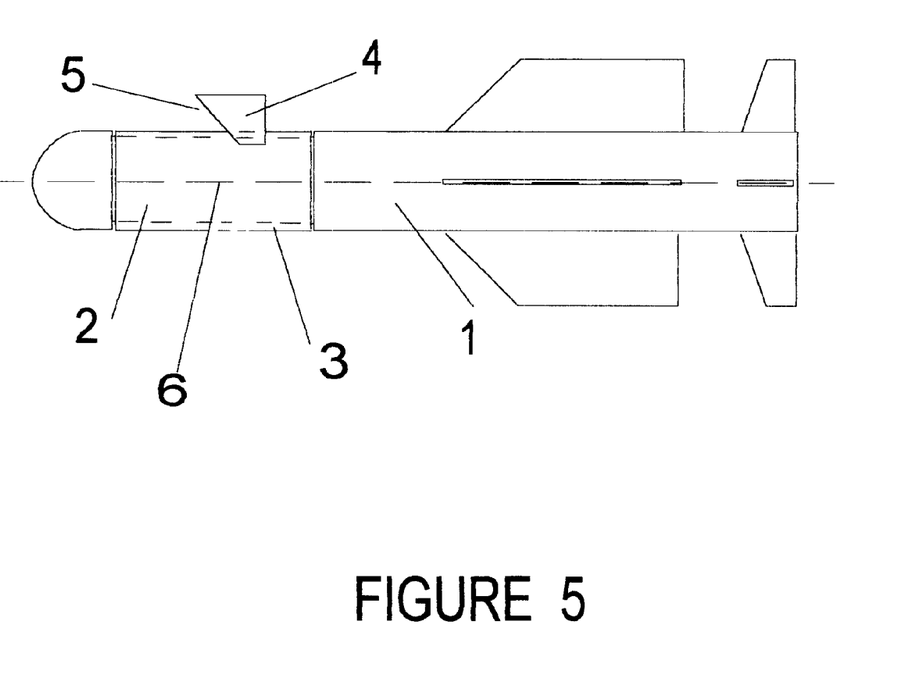
FIG. 5 shows a missile similar to that of FIG. 1 except that the protruding section has a flat forward facing surface area instead of the concave shape in FIG. 1.

FIG. 5 shows the missile 1 of FIG. 1 with a missile attachment 2, and a protruding section 4 protruding from a cylindrical tube 3. The protruding section 4 has a flat forward facing surface area 5 that is slanted forward. The cylindrical tube rotates around the part of the part of the missile encircled by the cylindrical tube such that the cylindrical tube has a longitudinal axis of rotation 6.

Figure 6:
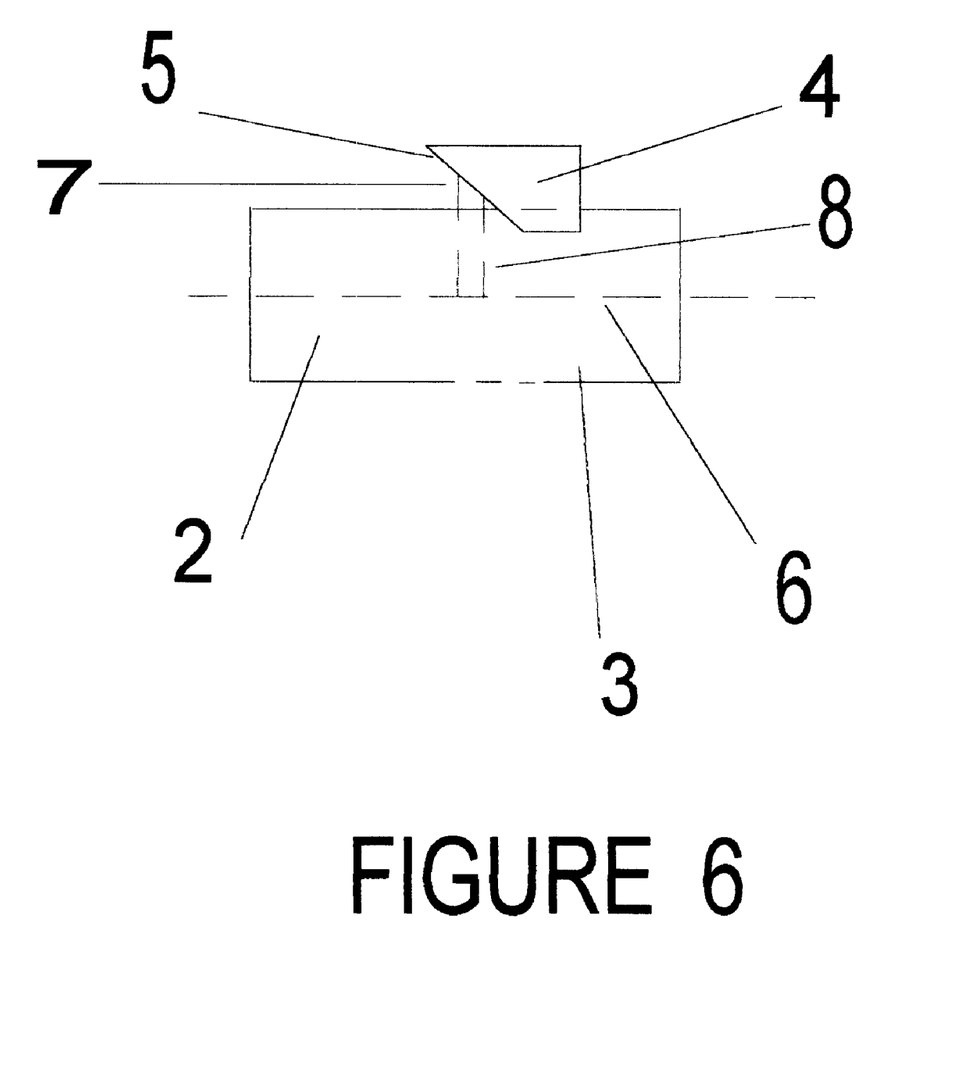
FIG. 6 is an enlarged image of the protruding section and the rotatable tube of FIG. 5.

FIG. 6 shows the missile attachment 2, the cylindrical tube 3 and the protruding section 4 of FIG. 5. FIG. 6 emphasizes the peculiar nature of the forward slant of the forward facing surface area 5. The forward facing surface area 5 can be seen to be laterally extending from the cylindrical tube 3 while leaning in a forward direction. The parallel lines 7 and 8 are shown extending radially from the longitudinal axis 6. Both parallel lines 7 and 8 are shown making contact with the forward slanted forward facing surface area 5. But because of the forward slant, the parallel lines are not equal in length.

Viewed from above, the missile attachment 2 of. FIG. 5 would appear as the missile attachment 2 of FIG. 2, with the forward facing surface area 5 facing a direction of travel which is a direction of travel that the missile would travel in when launched if the missile 1 of FIG. 5 was not affected by the missile attachment of FIG. 5.

The missile attachment 2 of FIG. 5 viewed from above would appear as the missile attachment 2 of FIG. 4 if the protruding section 4 was turned slightly anti-clockwise on the cylindrical tube 3, such that the forward facing surface area 5 of FIG. 5 would then be facing a direction of travel which is a direction of travel that has as a component the direction of travel that the missile would travel in when launched if the missile was not affected by the missile attachment.

Figure 7:
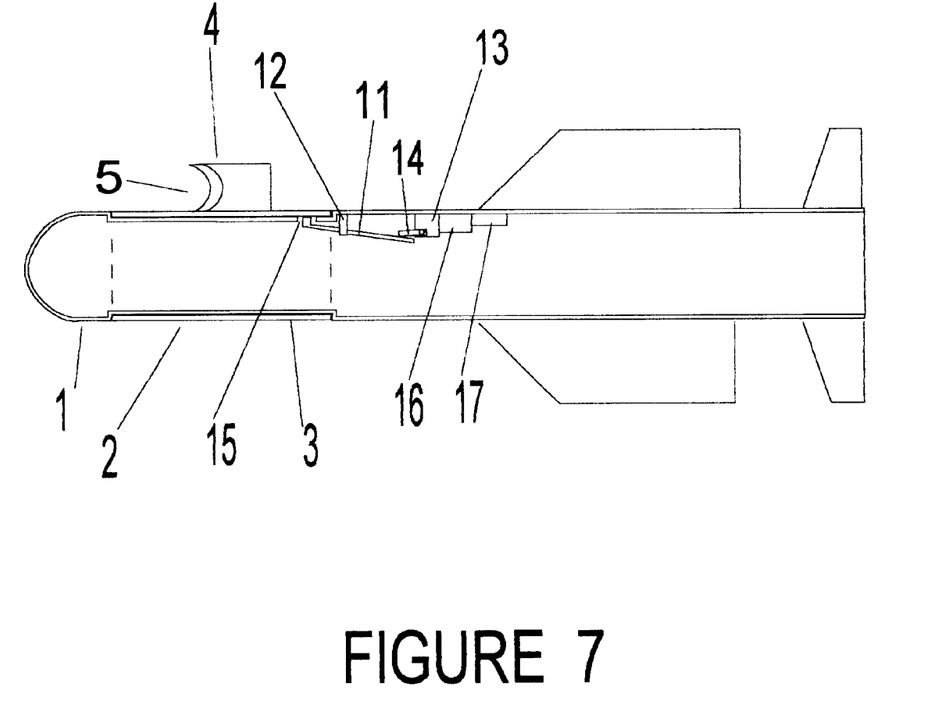
FIG. 7 shows a cross-sectional view of the side the missile of FIG. 1, the missile having been fitted with a friction inducing lever and an electric motor as a means for moving the lever.

FIG. 7 shows a cross-section of the missile 1 of FIG. 1 with the missile attachment 2. The missile attachment consists of a cylindrical tube 3 which encircles part of the missile 1, and a protruding section 4 with a concave forward facing surface area 5. Shown also is a lever 11 pivotly attached to the missile by a bracket 12, such that the lever 11 can be pivoted by an electric motor 13 using a rotor arm 14. When the lever is pivoted by the electric motor 13, using the rotor arm 14, a part of the lever is pressed through a hole 15 in the missile 1 so that the part of the lever that is pressed through the hole can reach the cylindrical tube. As the rotor arm 14 presses harder against the lever, the lever is pressed harder against the cylindrical tube. With the friction that occurs between the lever and the cylindrical tube, the rotation of the cylindrical tube relative to the missile can be controlled, so that the spiralling motion of the missile can be controlled. A computer 16 controls the action of the electric motor 13, and a battery 17 provides electrical power for the computer and the electrical motor.

Figure 8:
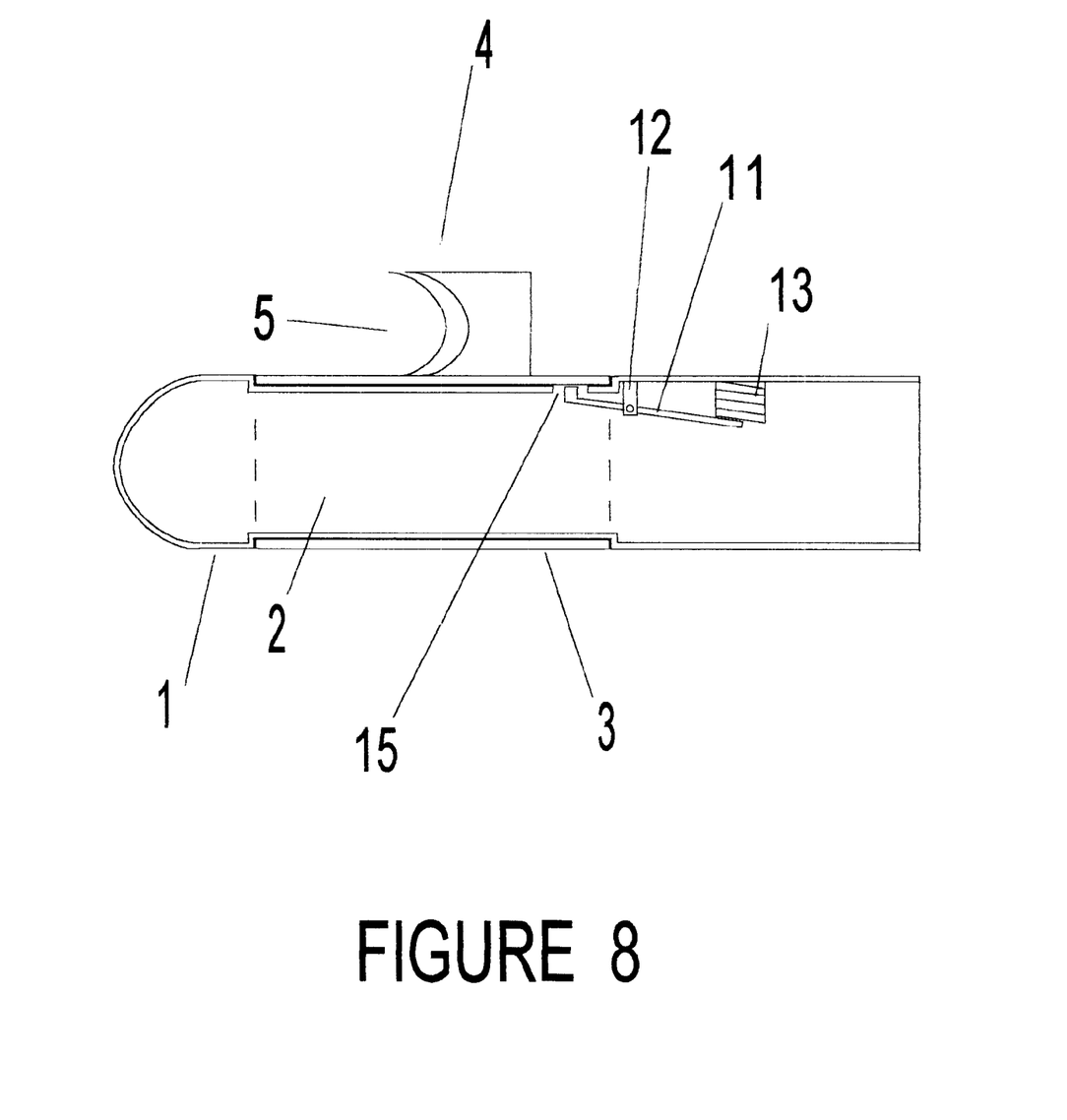
FIG. 8 shows a cross-sectional view of the side of the forward part of the missile of FIG. 1, the missile having been fitted with a friction inducing lever and a spring as a means for moving the lever.

FIG. 8 shows the cross section of the front of another form of the missile 1 with a missile attachment 2 according to this invention. Shown is the lever 11 pivotly attached to the missile 1 by a bracket 12. The lever 11 is pressed against the cylindrical tube 3 through a hole in the missile 15 when the lever is pivotly moved by a spring 13. The protruding section 4 has a concave forward facing surface area 5.

In another form of the invention the lever movement shown in FIG. 7 is achieved by using a hydraulic pump to move the lever instead of an electric motor.

Figure 9:
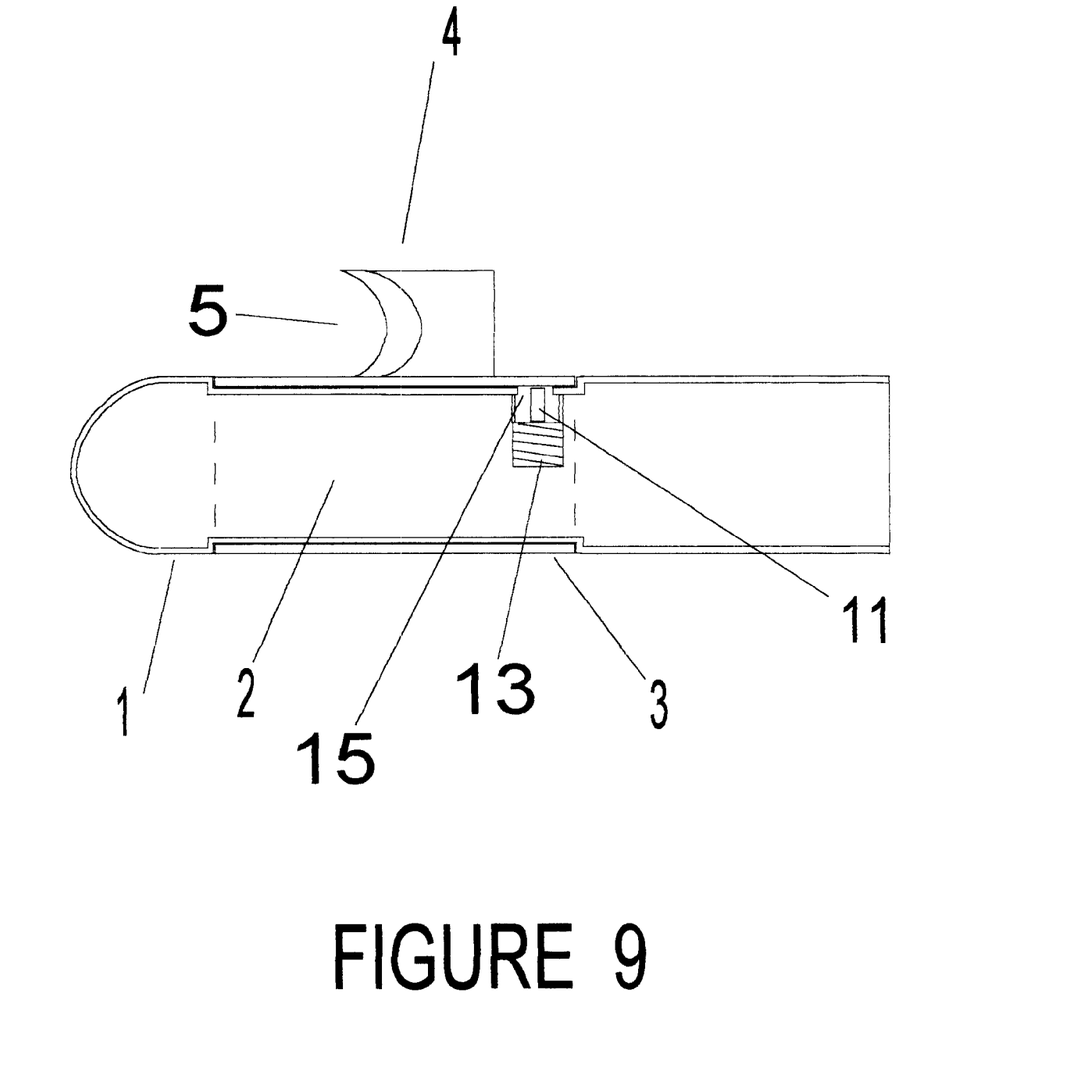
FIG. 9 shows a cross-sectional view of the side of the forward part of the missile of FIG. 1, the missile having been fitted with a friction inducing rod and a spring as a means for pushing the rod against the rotatable tube.

FIG. 9 shows a cross section of another form of the invention. Shown is the cross section of the front of the missile 1, with a missile attachment 2 consisting of a cylindrical tube 3 with a protruding section 4. The protruding section 4 has a forward facing surface area that is concave, and is facing a direction that has as a component the direction of travel that the missile would travel when launched if not affected by the missile attachment. Shown also in FIG. 9 is a friction inducing attachment consisting of a movable component in the form of a rod 11 that is pushed towards the cylindrical tube 3 by an actuating mechanism in the form of a spring 13, with the rod being pushed towards the cylindrical tube through an opening 15 in the body of the missile such that a rubbing action can occur between the cylindrical tube and the said rod.

In another form of the invention the rod is pushed towards the tube by means of a hydraulic pump exerting hydraulic pressure on the rod.

Figure 10:
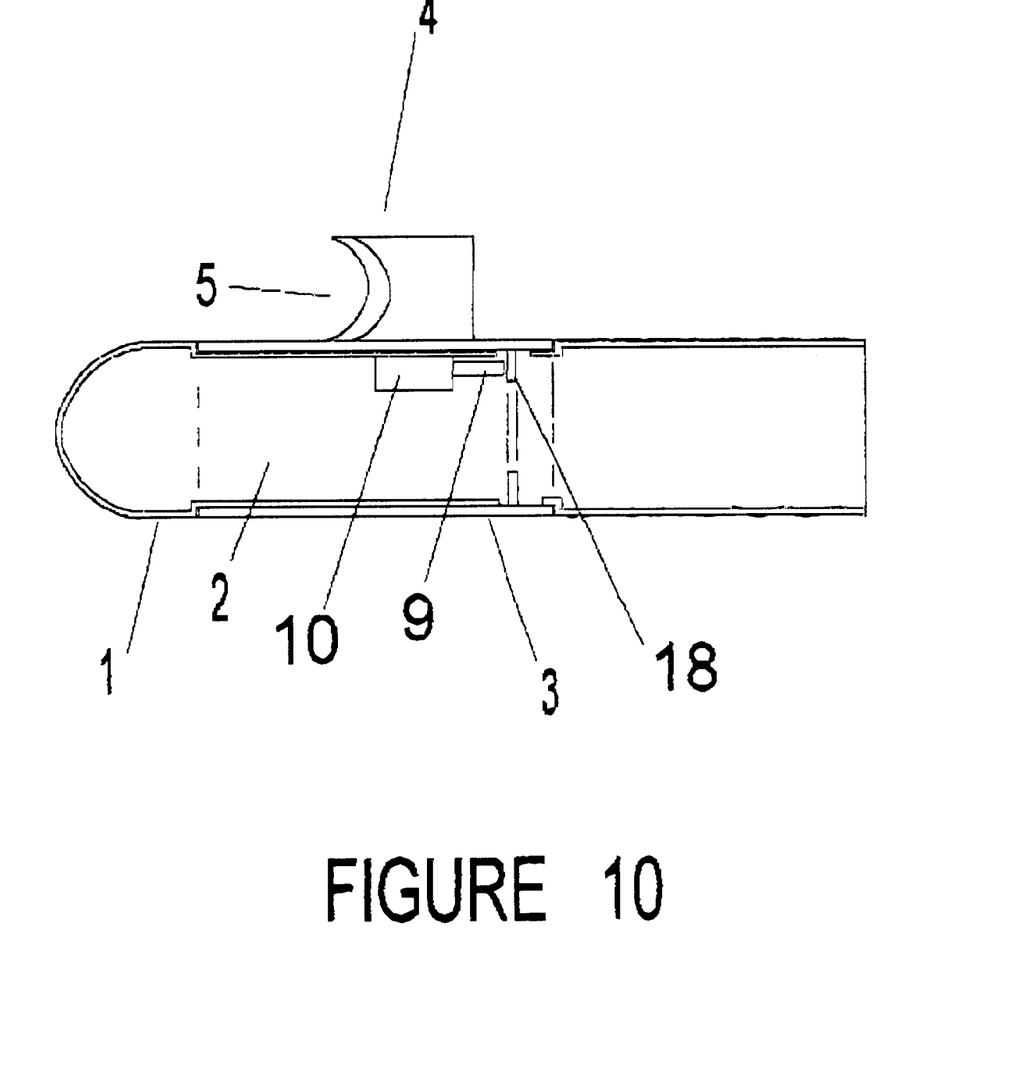
FIG. 10 shows a cross-sectional side view of the forward part of the missile of FIG. 1 with the rotatable tube having an additional protruding section protruding inwardly against which friction can be applied.

FIG. 10 shows a cross section of the front of another form of missile 1 according to this invention. It shows the missile 1 with a missile attachment 2. The missile attachment consists of a cylindrical tube 3 which has an externally protruding section 4 with a concave forward facing surface area 5. The cylindrical tube 3 also has an internally protruding section 18. In FIG. 10 the internally protruding section that protrudes inward from the cylindrical tube 3 is in the form of a disc that penetrates into the missile. The missile also has a friction inducing attachment. The friction inducing attachment consists of a moveable component 9 that is in the form of a rod 9 that can be pushed towards the internally protruding section 18 and an actuating mechanism that is in the form of hydraulic pump 10 that is used to push the rod towards the internally protruding section 18 by means of hydraulic pressure produced by the hydraulic pump 10.

The claims defining this invention are as follows:

1. A missile with a missile attachment, which said missile attachment consists of a tube with a protruding section, which said protruding section protrudes outward from the tube, and which said protruding section has a forward facing surface area, with the said tube attached to the missile such that a part of the said missile is encircled by the said tube and such that the said tube is able to rotate relative to the part of the missile that is encircled by the tube, with the tube able to achieve continuous rotation relative to the missile during flight of the missile due to impact between the forward facing surface area and air during flight of the missile, with a lever attached to the missile such that a part of the lever can be pushed towards the said tube so as to induce frictional force between the said lever and the tube, and with an actuating mechanism attached to the missile, which actuating mechanism is attached to the missile such that the actuating mechanism can push part of the lever towards the tube.

2. The missile of claim 1 wherein the said tube has a longitudinal axis of rotation, and with the missile and the tube in a horizontal position such that the longitudinal axis of rotation of the said tube is in a horizontal position and the protruding section is in an upper most position of t he tube, the said forward facing surface area faces a direction, which said direction has as a component a direction of travel that the missile would travel in when launched, if the missile was not affected by the missile attachment.

3. The missile of claim 1 wherein the said tube has a longitudinal axis of rotation, and with the missile and the tube in a horizontal position such that the longitudinal axis of rotation of the said tube is in a horizontal position and the protruding section is in an upper most position of the tube, said forward facing surface area faces a direction, which said direction is a direction of travel that the missile would travel in when launched, if the missile was not affected by the missile attachment.

4. The missile of any one of claims 1, 2 or 3 wherein the said actuating mechanism is in the form of an electric motor attached, which electric motor is attached to the missile such that the electric motor can move the said lever such that a part of the lever can be pushed towards the said tube such that frictional force between the said lever and the tube can be induced.

5. The missile of claim 4 wherein a computer is attached to the missile such that the computer can control the said electrical motor.

6. The missile of claim 5 wherein a battery is attached to the missile to provide electrical power for the electric motor and the computer.

7. The missile of any one of claims 1, 2 or 3, wherein the actuating mechanism is in the form of a hydraulic pump, which hydraulic pump is attached to the missile such that the hydraulic pump can move the said lever by means of hydraulic pressure produced by the said hydraulic pump such that frictional force between the said lever and the tube can be induced.

8. The missile of any one of claims 1, 2 or 3 wherein the said actuating mechanism is in the form of a spring, which spring is connected to the missile such that it can can push the said lever towards the tube such that frictional force between the said lever and the tube can be induced through movement of the lever towards the tube.

9. A missile with a missile attachment, which said missile attachment consists of a tube with a protruding section, which said protruding section protrudes outward from the tube, and which said protruding section has a forward facing surface area, with the said tube attached to the missile such that a part of the said missile is encircled by the said tube and such that the said tube is able to rotate relative to the part of the missile that is encircled by the tube, with the tube able to achieve continuous rotation relative to the missile during flight of the missile due to impact between the forward facing surface area and air during flight of the missile, and which said missile has a friction inducing attachment, which said friction inducing attachment is attached to the missile, which friction inducing attachment has a moveable component and an actuating mechanism, and which moveable component can be moved by the actuating mechanism relative to the missile such that the moveable component can be moved towards the tube by the actuating mechanism and such that a continuous rubbing action can occur between the moveable component and the tube, thereby creating friction between the said moveable component and the said tube during flight of the missile such that with friction the friction inducing attachment can allow the tube to continue to rotate relative to the encircled part of the missile but restrict rotation of the tube relative to the encircled part of the missile to a rate of rotation that is lower than a rate of rotation that the tube could achieve relative to the encircled part of the missile if the moveable component was not moved towards the tube.

10. The missile of claim 9 wherein the said tube has a longitudinal axis of rotation, and with the missile and the tube in a horizontal position such that the longitudinal axis of rotation of the said tube is in a horizontal position and the protruding section is in an upper most position of the tube, the said forward facing surface area faces a direction, which said direction has as a component a direction of travel that the missile would travel in when launched, if the missile was not affected by the missile attachment.

11. The missile of claim 9 wherein the said tube has a longitudinal axis of rotation, and with the missile and the tube in a horizontal position such that the longitudinal axis of rotation of the said tube is in a horizontal position and the protruding section is in an upper most position of the tube, the said forward facing surface area faces a direction, which said direction is a direction of travel that the missile would travel in when launched, if the missile was not affected by the missile attachment.

12. A missile with a missile attachment, which said missile attachment consists of a tube with a protruding section, which said protruding section protrudes outward from the tube, with the said tube attached to the missile such that a part of the said missile is encircled by the said tube and such that the said tube is able to rotate relative to the part of the missile that is encircled by the tube, with the tube able to achieve continuous rotation relative to the missile during flight of the missile due to impact between the protruding section and air during flight of the missile, and which said missile has a friction inducing attachment, which said friction inducing attachment is attached to the missile and which said friction inducing attachment has a moveable component and an actuating mechanism, and which moveable component can be moved by the actuating mechanism relative to the missile such that the moveable component can be moved towards the tube by the actuating mechanism and such that a continuous rubbing action can occur between the moveable component and the tube, thereby creating friction between the said moveable component and the said tube during flight of the missile such that with friction the friction inducing attachment can allow the tube to continue to rotate relative to the encircled part of the missile but restrict rotation of the tube relative to the encircled part of the missile to a rate of rotation that is lower than a rate of rotation that the tube could achieve if the moveable component was not moved towards the tube.

13. A missile with a missile attachment, which said missile attachment consists of a tube with an externally protruding section and an internally protruding section, with the said externally protruding section protruding outward from the tube, and the internally protruding section protruding inwardly of the tube, and which said externally protruding section has a forward facing surface area, with the said tube attached to the missile such that a part of the said missile is encircled by the said tube and such that the said tube is able to rotate relative to the part of the missile that is encircled by the tube, with the tube able to achieve continuous rotation relative to the missile during flight of the missile due to impact between the forward facing surface area and air during flight of the missile, and which said missile has a friction inducing attachment, which said friction inducing attachment is attached to the missile and which friction inducing attachment has a moveable component and an actuating mechanism, and which moveable component can be moved by the actuating mechanism relative to the missile such that the moveable component can be moved towards the internally protruding section of the said tube such that a continuous rubbing action can occur between the moveable component and the internally protruding section of the tube, thereby creating friction between the moveable component and the internally protruding section of the tube such that with frictional force the friction inducing attachment can allow the tube to continue to rotate relative to the encircled part of the missile but restrict rotation of the tube relative to the encirlced part of the missile to a rate of rotation that is lower than a rate of rotation that the tube could achieve relative to the encircled part of missile if the moveable component was not moved towards the internally protruding section of the tube.

14. The missile of claim 13 wherein the said tube has a longitudinal axis of rotation, and with the missile and the tube in a horizontal position such that the longitudinal axis of rotation of the said tube is in a horizontal position and the protruding section is in an upper most position of the tube, the said forward facing surface area faces a direction, which said direction has as a component a direction of travel that the missile would travel in when launched, if the missile was not affected by the missile attachment.

15. The missile of claim 13 wherein the said tube has a longitudinal axis of rotation, and with the missile and the tube in a horizontal position such that the longitudinal axis of rotation of the said tube is in a horizontal position and the protruding section is in an upper most position of the tube, the said forward facing surface area faces a direction, which said direction is a direction of travel that the missile would travel in when launched, if the missile was not affected by the missile attachment.

16. A missile with a missile attachment, which said missile attachment consists of a tube with an externally protruding section and an internally protruding section, with the said externally protruding section protruding outward from the tube, and the internally protruding section protruding inwardly of the tube, and with the said tube attached to the missile such that a part of the said missile is encircled by the said tube and such that the said tube is able to rotate relative to the part of the missile that is encircled by the tube, with the tube able to achieve continuous rotation relative to the missile during flight of the missile due to impact between the externally protruding section and air during flight of the missile, and which said missile has a friction inducing attachment, which said friction inducing attachment is attached to the missile and which friction inducing attachment has a moveable component and an actuating mechanism, and which moveable component can be moved by the actuating mechanism relative to the missile such that the moveable component can be moved towards the internally protruding section of the said tube such that a continuous rubbing action can occur between the moveable component and the internally protruding section of the tube, thereby creating friction between the moveable component and the internally protruding section of the tube such that with frictional force the friction inducing attachment can allow the tube to rotate relative to the encirlced part of the missile but restrict rotation of the tube relative to the encircled part of the missile to a rate of rotation that is lower than a rate of rotation that the tube could achieve relative to the encirlced part of the missile if the moveable component was not moved towards the internally protruding section of the tube.

17. The claim of any one of claims 9 to 16, wherein the said moveable component is a rod attached to the missile, which rod is attached such that the rod can be pushed towards the said tube so as to induce frictional force between the said rod and the tube.

18. The claim of any one of claims 9 to 16, wherein the said moveable component is a a moveable mass of solid matter attached to the missile, which moveable mass of solid matter is attached such that the moveable mass of solid matter can be pushed towards the said tube so as to induce frictional force between the said moveable mass of solid matter and the tube.

19. The missile of claim 17 wherein the actuating mechanism is a hydraulic pump, which hydraulic pump is attached to the missile such that the pump can move the said moveable rod towards the tube by means of hydraulic pressure produced by the said hydraulic pump such that frictional force between the said rod and the tube can be induced.

20. The missile of claim 17 wherein the actuating mechanism is a spring, which spring is connected to the missile such that the spring can push the said rod and such that frictional force between the said rod and the tube can be induced by the spring pushing the rod towards the tube.

21. The missile of claim 18 wherein the actuating mechanism is a hydraulic pump, which hydraulic pump is attached to the missile such that the pump can move the said moveable mass of solid matter towards the tube by means of hydraulic pressure produced by the said hydraulic pump such that frictional force between the said moveable mass of solid matter and the tube can be induced by moving the moveable mass of solid matter.

22. The missile of claim 18 wherein the actuating mechanism is a spring, which spring connected to the missile such that spring can push the said moveable mass of solid matter towards the tube such that frictional force between the said moveable mass of solid matter and the tube can be induced.

23. The missile of any one of claims 1, 2, 3, 9, 10, 11 13, 14 or 15, wherein the tube has a longitudinal axis of rotation and the forward facing surface area is concavely curved such that if the tube was placed in a horizontal position such that the longitudinal axis of rotation of the tube was placed in a horizontal position, and a side of the tube could be viewed while the tube was in the said horizontal position, and the protruding section was positioned on an upper most position on the tube such that the protruding section protruded above the tube, an outline of the forward facing surface area that protruded above the tube would appear concave with respect to the protruding section while a side of the tube is viewed from a position that is level in height to the longitudinal axis of rotation of the tube.

24. The missile of any one of claims 1, 2, 3, 9, 10, 11, 13, 14 or 15, wherein the tube has a longitudinal axis of rotation and the forward facing surface area is slanted forward such that the said forward facing surface area extends laterally away from the tube and such that as the forward facing surface area extends laterally away from the tube the forward facing surface area leans in a forward direction, and which said forward facing surface area is thus slanted forward relative to the longitudinal axis of rotation of the cylindrical tube, and such that if a plurality of lines are drawn radially away from the longitudinal axis of the tube, with each line drawn from a different point on the longitudinal axis to that of another line, and with the lines drawn from points on the longitudinal axis such that the lines could reach the forward facing surface area while drawn through an area in front of the forward facing surface area and while the lines are drawn parallel to one another, with the lines being of such respective lengths that the lines could make contact with the forward facing surface area while remaining parallel, but not be extended beyond the point of contact with the forward facing surface area, then one of the said lines would be shorter in length with respect to another of the said lines.

25. The missile of claim 16, wherein the tube has a longitudinal axis of rotation and the externally protruding section has a forward facing surface area, which forward facing surface area is concavely curved such that if the tube was placed in a horizontal position such that the longitudinal axis of rotation of the tube was placed in a horizontal position, and a side of the tube could be viewed while the tube was in the said horizontal position, and the protruding section was positioned on an upper most position on the tube such that the protruding section protruded above the tube, an outline of the forward facing surface area that protruded above the tube would appear concave with respect to the protruding section while a side of the tube is viewed from a position that is level in height to the longitudinal axis of rotation of the tube.

26. The missile of claim 16, wherein the tube has a longitudinal axis of rotation and the externally protruding section has a forward facing surface area, which forward facing surface area is slanted forward such that the said forward facing surface area extends laterally away from the tube and such that as the forward facing surface area extends laterally away from the tube the forward facing surface area leans in a forward direction, and which said forward facing surface area is thus slanted forward relative to the longitudinal axis of rotation of the cylindrical tube, and such that if a plurality of lines are drawn radially away from the longitudinal axis of the tube, with each line drawn from a different point on the longitudinal axis to that of another line, and with the lines drawn from points on the longitudinal axis such that the lines could reach the forward facing surface area while drawn through an area in front of the forward facing surface area and while the lines are drawn parallel to one another, with the lines being of such respective lengths that the lines could make contact with the forward facing surface area while remaining parallel, but not be extended beyond the point of contact with the forward facing surface area, then one of the said lines would be shorter in length with respect to another of the said lines.

27. The claim of any one of claims 9 to 12, wherein the said moveable component is a rod attached to the missile, which rod is attached such that the rod can be moved towards the said tube through a hole in the said missile so as to induce frictional force between the said rod and the tube through such movement of the rod.

28. The claim of any one of claims 1 to 3, 9 to 16, 25 or 26 wherein the said tube is in the form 10 of a cylindrical tube.

29. The claim of claim 23 wherein the said tube is in the form of a cylindrical tube.

30. The claim of claim 24 wherein the said tube is in the form of a cylindrical tube.

31. The claim of any one of claims 13 to 16, wherein the said moveable component is a rod attached to the missile, which rod is attached such that the rod can be pushed towards the said internally protruding section so as to induce frictional force between the said rod and the internally protruding section.

32. The missile of claim 31 wherein the actuating mechanism is a hydraulic pump, which hydraulic pump is attached to the missile such that the pump can move the said moveable rod towards the internally protruding section by means of hydraulic pressure produced by the said hydraulic pump such that frictional force between the said rod and the internally protruding section can be induced.

33. The missile of any one of claims 1, 2, 3, 9, 10, 11 13, 14 or 15, wherein the forward facing surface area is concave with respect to the protruding section.

34. The missile of any one of claims 1, 2, 3, 9, 10, 11 13, 14 or 15, wherein the forward facing surface area is slanted forward with respect to the tube.

* * * * *